(12) United States Patent
Kurani et al.

(10) Patent No.: US 10,721,226 B1
(45) Date of Patent: Jul. 21, 2020

(54) USER-LEVEL TOKEN FOR USER AUTHENTICATION VIA A USER DEVICE

(71) Applicant: Wells Fargo Bank, N.A., San Francisco, CA (US)

(72) Inventors: Ashish B. Kurani, Hillsborough, CA (US); Kristine Ing Kushner, Orinda, CA (US); Brian M. Pearce, Pleasanton, CA (US); Steven E. Puffer, Champlin, MN (US); Nikolai Stroke, Gilbert, AZ (US); Paul Vittimberga, Oakland, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 86 days.

(21) Appl. No.: 15/456,080

(22) Filed: Mar. 10, 2017

(51) Int. Cl.
*G06F 21/00* (2013.01)
*H04L 29/06* (2006.01)

(52) U.S. Cl.
CPC ........ *H04L 63/0853* (2013.01); *H04L 63/083* (2013.01); *H04L 63/0861* (2013.01); *H04L 63/0876* (2013.01)

(58) Field of Classification Search
CPC ............. H04L 63/0853; H04L 63/0861; H04L 63/083; H04L 63/0876
See application file for complete search history.

(56) References Cited

U.S. PATENT DOCUMENTS

| | | |
|---|---|---|
| 6,775,782 B1 | 8/2004 | Buros et al. |
| 9,060,057 B1 | 6/2015 | Danis |
| 9,084,114 B2 | 7/2015 | Beilis et al. |
| 9,124,572 B1 | 9/2015 | Hromi et al. |
| 9,232,394 B2 | 1/2016 | Bombacino et al. |
| 9,288,062 B2 | 3/2016 | Feltham et al. |
| 9,846,878 B2 | 12/2017 | Kumnick et al. |
| 2009/0182674 A1 | 7/2009 | Patel et al. |
| 2013/0159154 A1 | 6/2013 | Purves et al. |
| 2014/0006190 A1 | 1/2014 | Loomis et al. |
| 2015/0025874 A1 | 1/2015 | Matute |

(Continued)

FOREIGN PATENT DOCUMENTS

| | | |
|---|---|---|
| EP | 2096829 B1 | 9/2009 |
| WO | WO02/43346 A1 | 5/2001 |

(Continued)

OTHER PUBLICATIONS

Chow et al., "Authenticating Displayed Names in Telephony", Bell Labs Technical Journal, 14(1), 267-282, 2009.

(Continued)

*Primary Examiner* — Kendall Dolly
(74) *Attorney, Agent, or Firm* — Foley & Lardner LLP

(57) ABSTRACT

A computer implemented method performed by an identity verification computing system includes receiving a request to provide an identity verification of a user via an entity computing system, the request including data associated with a user device associated with the user. A user-level profile associated with the user device is accessed. A user-level token is requested from the user device. The user-level token is associated with the user-level profile. The user-level token is received from the user device, and validated. An identity verification approval is transmitted to the entity computing system.

26 Claims, 6 Drawing Sheets

(56) References Cited

U.S. PATENT DOCUMENTS

| | | |
|---|---|---|
| 2015/0058931 A1* | 2/2015 | Miu ................. H04L 63/126 |
| | | 726/3 |
| 2015/0161603 A1 | 6/2015 | Fish |
| 2015/0236857 A1 | 8/2015 | Feltham et al. |
| 2015/0312248 A1 | 10/2015 | Pruthi et al. |
| 2016/0078430 A1* | 3/2016 | Douglas ............ G06Q 30/0185 |
| | | 705/43 |
| 2016/0330027 A1 | 11/2016 | Ebrahimi |
| 2017/0147975 A1 | 5/2017 | Natarajan et al. |
| 2017/0346851 A1* | 11/2017 | Drake ................ H04L 63/1466 |
| 2018/0232725 A1 | 8/2018 | Dooley et al. |

FOREIGN PATENT DOCUMENTS

| | | |
|---|---|---|
| WO | WO2007/009343 A1 | 1/2007 |
| WO | WO2014/087179 A1 | 6/2014 |
| WO | WO2015/198136 A1 | 12/2015 |

OTHER PUBLICATIONS

Gommans et al., "Token-based authorization of Connection Oriented Network resources", Gridnets conference proceedings, 2004. 8 pages.

You et al., "A Study on the Two-channel Authentication Method which Provides Two-way Authentication using Mobile Certificate in the Internet Banking Environment", Institute of Electrical and Electronics Engineers, Inc., vol. 36, No. 8, 2008. 8 pages.

\* cited by examiner

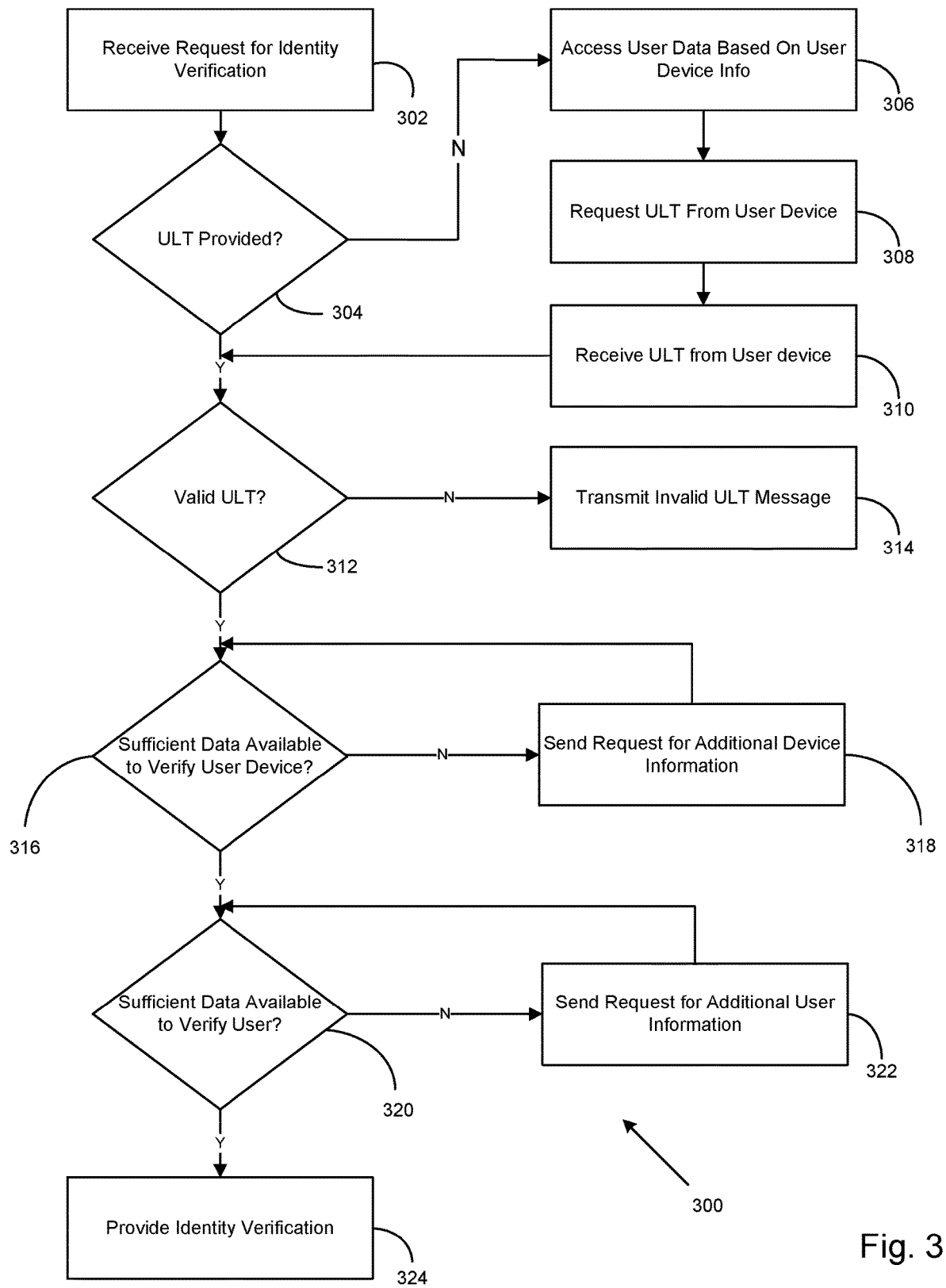

USER-LEVEL TOKEN FOR USER AUTHENTICATION VIA A USER DEVICE

BACKGROUND

Identity verification is necessary to ensure that an individual is who he or she purports to be. In financial industries, identity verification is often required by "know your customer" (KYC) or "customer identification program" (CIP) regulations. KYC and CIP programs are implemented to prevent identity theft, financial fraud, money laundering and terrorist financing. Furthermore, identity verification is used to perform many different functions in normal daily activities, such as making credit or debit card purchases, using an ATM, online shopping, purchasing a plane ticket, contacting customer service, etc. The constant need to verify one's identity, however, may become tedious for the user over time. Therefore, it would desirable to have systems and methods for automatically performing identity verification of a user by utilizing identity verifying information contained on a user device.

SUMMARY

According to one example embodiment, a computer implemented method performed by an identity verification computing system includes receiving a request to provide an identity verification of a user via an entity computing system. The request includes data associated with a user device associated with the user. The request further includes instructions to the user device to open an application associated with the user-level token, and an address to transmit the user-level token to the identity verification computing system. A user-level profile associated with the user device is accessed. A user-level token is obtained from the user device. The user-level token is associated with the user-level profile. The user-level token is received from the user device, and validated. An identity verification approval is transmitted to the entity computing system.

According to another example embodiment, a system includes an entity computing device configured to interface with a user device associated with a user, and an identity verification computing system. The identity verification computing system includes a processor and instructions stored in non-transitory machine-readable media. The instructions are configured to cause the identity verification computing system to obtain an identity verification request for the user from the entity computing device. The request includes data associated with a user device associated with the user. The request further includes instructions to the user device to open an application associated with the user-level token, and an address to transmit the user-level token to the identity verification computing system. A user-level profile associated with the user device is accessed. A user-level token is requested from the user device. The user-level token is associated with the user-level profile. The user-level token is received from the user device. The user-level token is validated and an identity verification approval is transmitted to the entity computing system.

According to another example embodiment, an identity computing system includes a network interface configured to communicate with an entity computing system via a network. The identity computing system further includes an identity database configured to store a plurality of user-level profiles, a memory and at least one processor. The processor is configured to receive an identity request for a user from the entity computing device. The request includes data associated with a user device associated with the user. The request further includes instructions to the user device to open an application associated with the user-level token, and an address to transmit the user-level token to the identity verification computing system. A user-level profile associated with the user device is accessed. A user-level token is requested from the user device, the user-level token is associated with the user-level profile. The processor receives the user-level token from the user device, validates the user-level token, and transmits an identity verification approval to the entity computing system.

BRIEF DESCRIPTION OF THE FIGURES

The details of one or more implementations are set forth in the accompanying drawings and the description below. Other features, aspects, and advantages of the disclosure will become apparent from the description, the drawings, and the claims.

FIG. 3 is a flow diagram of a method of processing an identity verification request, according to various embodiments.

DETAILED DESCRIPTION

Figure 1:
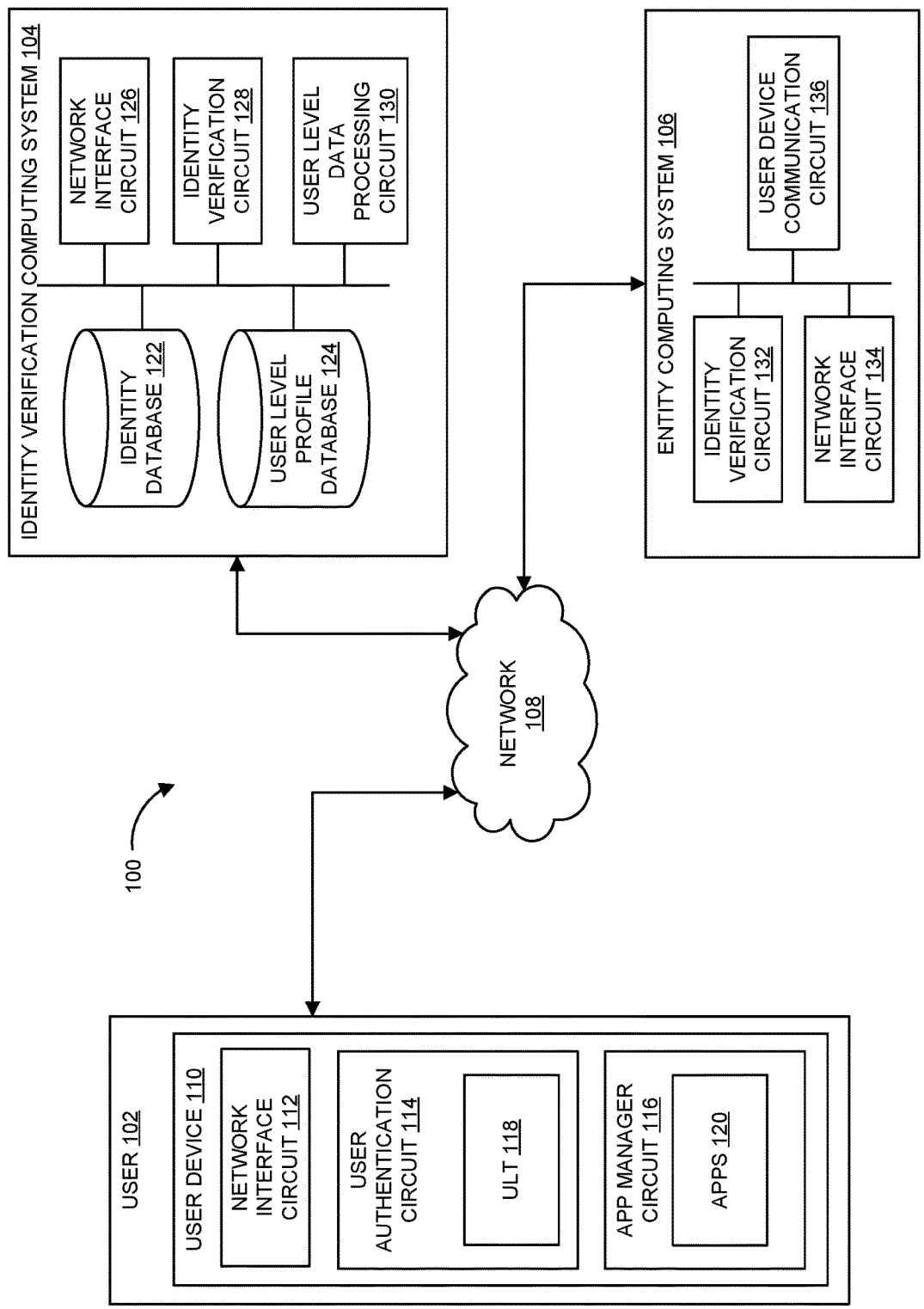
FIG. 1 is a block diagram of a data processing system, according to an embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Certain companies, organizations, or other entities may be better situated than others to verify the identities of individuals. For example, financial institutions (FIs) are required to comply with know your customer (KYC) and Customer Identification Program (CIP requirements. As such, FIs request and obtain access to substantial identifying information from new customers when accounts are opened, and may be particularly well-suited and trusted to perform accurate identity verification and related services. In many cases, such identity verification is performed in person, e.g., a banker compares a driver's license photo to the person standing in front of them as part of the account opening process. Accordingly, other entities (e.g., merchants) may rely on the fact that a trusted party (e.g., an FI) has verified an individual's identity rather than solely engaging in their own identity verification efforts. In some cases, an entity (e.g., a merchant) may choose to accept identity verification only from certain identity verification computing systems. For example, a merchant may trust identity verification performed by a U.S. bank, but may not trust purported identity verification performed by other entities that are not subject to KYC and CIP requirements. Similarly, the trusted party may be the most reliable source for storing additional information associated with the identity of an individual. Additionally, current methods of verifying identity over the phone may be vulnerable to eavesdropping, which may lead to sensitive information falling into the hands of various bad actors. For example, identity verification is often performed by the call center personnel requesting various bits of information from the customer. For example, the call center personnel will often ask for account numbers, all or part of a social security number (SSN), a mother maiden name, etc. This data can be valuable to identity thieves and therefore is vulnerable to interception.

Referring generally to the figures, systems and methods for providing identity verification via a user-level token are shown. According to various embodiments, an identity verification computing system may verify the identity of an individual and create a user-level token ("ULT") for the individual. For example, the ULT may be linked to a user-level profile maintained by an FI, or other institution. The ULT profile may include personal or other information related to a user, including financial information and non-financial information. The user-level profile may also include non-financial information such as identity information of the user (age, address, name, height, weight, biometrics, etc.), non-financial account information (frequent flyer miles, rewards/loyalty program information, social media accounts, on-line service accounts such as online dating accounts, etc.), multiple IDs (personal, business, etc.), device information (cellular phone number, cellular phone identifying information such as a media access control ("MAC") address, or device ID number (e.g. ISDN number), other device information such as a list of installed apps associated with the FI, and so on. In some instances, the user will directly provide some of the non-financial data to the FI during or after setting up an account with the FI. In other instances, some of the non-financial data may be dynamically gathered by the FI over time. Generally, the verification of the information by the FI will be more trusted due to the additional verification requirements provided by the FI. The ULT profile may also include financial information such as payment cards, account numbers, DDA accounts, credit information, etc.

The ULT may then be pushed to a user device such as a smartphone. In some embodiments, identifying information associated with the smartphone is provided to the FI before the ULT is provisioned. In some embodiments, the ULT may be stored in a virtual passport or mobile wallet on the user device. The virtual passport may be used, for example, to verify an individual's identity to entities (e.g., merchants, currency exchanges, etc.), to objects (e.g., ATMs), to other individuals, etc. The virtual passport may include identification of the particular identity verification computing system that generated the virtual passport. An example virtual passport identity management system is described in U.S. patent application Ser. No. 14/937,210, entitled "Identity Management Service via Virtual Passport," by Kurani et al., which is herein incorporated by reference in its entirety and for all purposes. In other embodiments, the ULT may be stored in an application associated with the FI, such as a mobile banking app. In some examples, an access mechanism, such as a password, fingerprint image, etc. must be provided by the user to access the ULT.

According to various embodiments, as described in further detail below, utilizing an existing user profile to automatically provide real-time authentication of a user improves an ability of an FI, merchant, or other entity to quickly and accurately obtain user information for authenticating a customer. Additional value-add functionality can be achieved by allowing an entity, such as an FI, to quickly verify and/or authenticate a user by dynamically "pulling" a ULT from a user device automatically, when user authentication is needed. By pulling the ULT from a user device automatically, user authentication can be provided without any explicit action being undertaken by the customer. Additionally, this allows for the device itself to be verified, and not just a simple phone number. For example, the ULT may be provided automatically by the user device without requiring an input (e.g., approval) to the user device by the user (e.g., customer). By automatically authenticating an identity of a customer, various transactions, such as customer service, purchases, etc., may be simplified, allowing for a more seamless customer experience. Furthermore, the following embodiments describe a third-party providing verification of a device for one or more other entities. This can reduce the amount of information required to be given to multiple entities to verify an identity of the customer. Accordingly, the embodiments described herein solve the technical and internet-centric problem of providing user identification information related to an individual transaction.

The ULT may be used in various different scenarios to enhance/streamline identity verification processes and provide other related services. For example, in one example scenario, the user may be calling into a call center. For example, the user may be calling into the call center of a utility company attempting to inquire about billing information for the user. At the beginning of the call, the user may provide the user's account number. The utility company may then send an identity verification request to the identity verification service. The identity verification request may, for example, include the phone number of the incoming call along with other identifying information of the user (e.g., name, address), etc. The utility company and the identity verification service may have a trusted relationship with each other, such that a mechanism is in place for the identification verification service to confirm that the identity verification request is coming from a trusted entity. The identity verification service may then perform a pull operation in which the ULT is pulled from the user's device (e.g., a smart phone). The fact that the identity verification service is able to pull the ULT from the user device provides confirmation that a fraudster has not obtained the user's device and performed a "factory reset" of the device, which would erase the token from the device. The identity verification service may also check the user device to ensure that a lock mechanism is in place that requires authentication (e.g., a password, fingerprint swipe, etc.) to gain access to the user device, and that the user device is unlocked. Based on these checks, the identity verification service may provide a response to the utility company indicating that the caller is calling from a secured phone that belongs to the customer, that the profile for the customer (e.g., name and address) stored at the identity verification services matches the customer information provided by the utility, and therefore the call appears to be authentic and not fraudulent.

In another example scenario, a user may walk into a location with a user may walk into a mall or other location with Bluetooth low energy beacons (e.g., iBeacons). A beacon at the mall location may activate a mall application on the phone of the user. The mall application may locate the ULT on the phone of the user. The mall application may cause an entity computing system (e.g., a computing system of the mall, a computing system of a merchant within the mall, etc.) to pull the ULT from the user's phone and send the ULT to the identity verification service to obtain the identity of the user. The identity verification service may then respond with the identity of the user, which may be matched by the entity computing system with other information known about the user (e.g., past purchase history). Based on this information, the entity computing system may provide customized content (e.g. ads, offers, etc.) that may be of interest to the user. As another example, the arrangement may be used to provide enhanced authentication for merchandise pickup. For example, an entity computing system may pull a ULT from the user's phone when the user purchases expensive merchandise (e.g., a new ring which needed to be fitted and therefore must be picked up later). The entity computing system may again pull the ULT from the user's phone when the user returns to pick up the merchandise. Again, the user may be required to authenticate to the phone both when the merchandise is purchased and when it is picked up. In this manner, enhanced security for the expensive purchase is provided.

FIG. 1 is a block diagram of a user authentication system 100, according to an embodiment. The user authentication system 100 includes a user 102, an identity verification computing system 104, and an entity computing system 106. The user 102, the identity verification computing system 104, and the entity computing system 106 may communicate directly or through a network 108, which may include one or more of the Internet, a cellular network, Wi-Fi, Wi-Max, a proprietary banking network, or any other type of wired or wireless network.

The user 102 may be associated with a user device 110. The user device 110 is a device configured to communicate with the entity computing system 106. In some embodiments, the user device 110 communicates directly with the entity computing system 106. For example, the user device 110 may communicate wirelessly to the entity computing system 106, such as via Wi-Fi, Bluetooth, Near Field Communication (NFC), ZigBee, IR, RF, Cellular (3G, 4G, LTE, CDMA), etc. In other embodiments, a display on the user device 110 may generate a machine readable image which may be readable by the entity computing system 106, such as a bar code, a QR code, or other machine readable image. The machine readable image may contain user related data, such as a ULT. In other embodiments, the user device 110 communicates with the entity computing system 106 via the network 108. For example, the user device 110 may transmit a ULT directly to the entity computing system 106. The entity computing system 106 may then transmit the ULT to the identity verification computing system 104. In other examples, the user device 110 may transmit the ULT directly to the identity verification computing system 104 when a verification request is received from the entity computing system 106. The identity verification computing system 104 may then provide the identity verification to the entity computing system 106.

The user device 110 may be, but is not limited to a phone (e.g., iPhone, Android Phone, Windows Phone, or other smartphone), a mobile computing device (e.g. tablet computer, laptop computer, personal digital assistant, netbook, etc.), a desktop computing device, a wearable computing device, or the like. The user 102 may be associated with the user device 110, such that the user device 110 is utilized for authentication purposes. For example, the user device 110 may include an input device for the user to enter a password, a fingerprint scanner to scan a finger print, etc., and authentication of the user by the user device 110 may be leveraged to facilitate authentication of the user to the entity computing system 106. The user device 110 may be registered with the identity verification computing system 104. The user device 110 may be registered to the identity verification computing system 104 using one or more identifying characteristics of the user device 110. Identifying characteristics can include a phone number, a MAC address, a device serial number, an FCC identification number, etc.

The user device 110 is shown to include a network interface circuit 112, a user authentication circuit 114, and an app manager circuit 116. The network interface circuit 112 is configured to facilitate data communication to and from other devices via the network 108. In some embodiments, data passing through the network interface circuit 112 is encrypted.

The user authentication circuit 114 is structured to allow the user device 110 to communicate data to and from the identity verification computing system 104 via the network interface circuit 112 and the network 108. For example, the user authentication circuit 114 may include a user interface that permits the user 102 to provide information to the identity verification computing system 104 via the user device 110. The user authentication circuit 114 may also be utilized to display messages and other prompts from the identity verification computing system 104. For example, the user 102 may utilize the user authentication circuit 114 to establish a user account with the identity verification computing system 104, or to request authentication services on behalf of the user 102. In one embodiment, the user authentication circuit 114 may store one or more ULT 118.

In some embodiments, the user authentication circuit 114 includes programming instructions stored in a memory of the user device 110 that is executed locally on the user device 110 (e.g., as a smartphone application 120). For example, the user authentication circuit 114 may be or include a mobile banking application associated with the identity verification computing system 104. In other arrangements, the user authentication circuit 114 includes a web-based interface application accessed via the network 108 (e.g. the Internet), such as by a web browser executed on the user device 110. In such arrangements, the user authentication circuit 114 may be executed and/or maintained at least in part remotely by the identity verification computing system 104. In this instance, the user 102 logs onto or accesses the web-based interface to access the user authentication circuit 114. In some embodiments, the user authentication circuit 114 is supported by a separate computing system comprising one or more servers, processors, network interface circuits, etc. In further arrangements, the user authentication circuit 114 includes or utilizes an application programming interface (API) and/or a software development kit (SDK) that facilitates the integration of other applications 120 (e.g., a mobile banking application, a mobile wallet application, a virtual passport application, a third party provider application, etc.) with the user authentication circuit 114.

The app manager circuit 116 is configured to manage one or more software applications ("apps") 120 associated with the user device 110. The applications 120 may include one or more applications 120 associated with the identity verification computing system 104. For example, where the identity verification computing system 104 is associated with an FI, the applications 120 may include a mobile banking application. In some examples, the user authentication circuit 114 may be, or include a mobile banking application, which may be controlled by the app manager circuit 116. The mobile banking application may allow for direct communication to the identity verification computing system 104, as described above. In further examples, the applications 120 may include a mobile wallet application. The applications 120 can further include a number of third party applications. In one embodiment, the app manager circuit 116 processes requests from the network interface circuit 112 and/or the user authentication circuit 114 to execute one of the applications 120. The user authentication circuit 114 may request that the app manager circuit 116 open a mobile banking application to obtain information within the mobile banking application for use in authenticating the identity of the user 102. For example, where the user authentication circuit 114 is a mobile banking, or other, application 120, the app manager circuit 116 can process a request from the network interface circuit 112 to initiate the mobile banking application associated with the user authentication circuit 114. In a further embodiment, the app manager circuit 116 controls access to the apps 120. For example, the app manager circuit 116 may control access between applications 120, as well as between an application 120 and the network interface circuit 112.

The identity verification computing system 104 and the entity computing system 106 may each include a computer system (e.g., one or more servers, each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein. The identity verification computing system 104 and the entity computing system 106 may each include server-based computing systems, for example, comprising one or more networked computer servers that are programmed to perform the operations described herein. The identity verification computing system 104 and the entity computing system 106 may each be implemented as distributed computer systems where each function is spread over multiple computer systems.

In one embodiment, the identity verification computing system 104 is managed by a third-party service provider to provide identity verification services to various entities. For example, the entity computing system 106 may utilize the identity verification computing system 104 to verify that the user 102 is who he or she purports to be. The entity computing system 106 may wish to verify the identity of the user 102 for any of various reasons, such as to prevent payment (e.g., credit card) fraud, banking fraud, identity fraud, illegal activity (e.g., harassment, scams, money laundering, etc.), catfishing, sockpuppetry, underage signups, spamming, etc. In some examples, the identity verification computing system 104 may be a trusted third-party computing system that is configured to verify that the user 102 is who he or she purports to be. The identity verification computing system 104 may provide identity verification services through an API. Generally, an API is a software-to-software interface that allows computing systems of two different entities to communicate with each other. In this instance, the API of the identity verification computing system 104 may be used by the entity computing system 106 and/or other entities to verify the identities of individuals. The identity verification computing system 104 may distribute a software development kit (SDK) to allow the customers to better integrate the API into their websites and applications. Some embodiments may include multiple identity verification computing systems 104.

According to various embodiments, the identity verification computing system 104 may be managed by an FI, a governmental institution, a credit bureau, a dedicated identity verification service provider, or another type of business or entity. For example, the identity verification computing system 104 may be managed by an FI that provides banking services (e.g., deposit account services, credit account services, brokerage account services, etc.) to individuals and entities, such as the user 102. In the instance in which the user 102 is a current financial account holder, the identity verification computing system 104 (e.g., FI) already has a significant amount of information regarding the individual's identity, which has been collected through the onboarding process for opening an account with the FI. During the initial onboarding process used by the FI to verify the user 102 before permitting the user 102 to become an account holder, the user 102 may provide certain personal information, such as their legal name, address, contact information, driver's license number, tax identification number, social security number, and the like. The personal information provided during the onboarding process was previously verified prior to permitting the user 102 to open an account with the FI. Such information may be provided in connection with KYC and/or CIP regulations.

The identity verification computing system 104 includes an identity database 122, a user-level profile database 124, a network interface circuit 126, an identity verification circuit 128, and a non-financial data processing circuit 130. The identity database 122 stores information relating to the identities of individuals, customers, users, account holders, etc. The identity database 122 may also store information relating to the identity service. Similarly, the user-level profile database 124 stores information relating to generated user-level profiles for each user 102. As described above, the user-level profiles may include additional information about a user 102, such as identity information of the user 102 (age, address, name, height, weight, biometrics, etc.), non-financial account information (frequent flyer program information, rewards/loyalty program information, social media accounts, on-line service accounts such as online dating accounts, etc.), multiple IDs (personal, business, etc.), and or user device 110 information (MAC address, device serial number, phone number, IP address, etc.). In certain embodiments, the user-level profile database 124 may be in communication with the identity database 122, and may initially populate a user-level profile for the user 102 with data contained in the identity database 122. In other embodiments, the identity database 122 and the user-level profile database 124 may be part of the same database.

The network interface circuit 126 facilitates data communications to and from the identity verification computing system 104. The network interface circuit 126 includes hardware (e.g., Ethernet controller, memory, etc.) and software necessary to facilitate data communications over the network 108 by the identity verification computing system 104. In some embodiments, data passing through the network interface circuit 126 is encrypted.

The identity verification circuit 128 is structured to generate and manage user-level profiles and user-level tokens for individuals, and to verify the identity of individuals. For example, the identity verification circuit 128 may generate a user-level profile for the user 102, based on various types of personal identifying information, as described above. In some embodiments, the identity verification circuit 128 populates a user-level profile for the user 102 based on user information already stored in the identity database 122. In further embodiments, the user 102 may be able to provide information to the identity verification circuit 128, such as via the user device 110, for populating the user-level profile.

According to various embodiments, the user authentication system 100 may include multiple identity verification computing systems 104 and multiple entity computing systems 106.

The entity computing system 106 may include an identity verification circuit 132, a network interface circuit 134 and a user device communication circuit 136. The identity verification circuit 128 is structured to verify the identity of individuals via operative communication with the identity verification circuit 128 of the identity verification computing system 104. For example, the identity verification circuit 128 may be structured to analyze information received from the user 102, and/or to format and send API calls to the identity verification computing system 104 to verify the identity of individuals. The network interface circuit 112 facilitates data communications to and from the entity computing system 106. The network interface circuit 112 includes hardware (e.g., Ethernet controller, memory, etc.) and software necessary to facilitate data communications for the entity computing system 106 over the network 108.

According to various embodiments, identity verification may be facilitated through the user device communication circuit 136 of the entity computing system 106. For example, the user device communication circuit 136 may include a caller identification system operated by the entity computing system 106. In another embodiment, the user device communication circuit 136 may include a backend server system that provides a website (e.g., an online shopping website) and/or a mobile application 120 (e.g., a smartphone application, a tablet application, etc.) associated with the entity computing system 106. In another embodiment, the user device communication circuit 136 may be a wireless transceiver configured to communicate with one or more user devices 110 within a proximity of the user device communication circuit 136. For example, the wireless transceiver may communicate with the user devices 110 via multiple wireless communication protocols, such as Bluetooth, cellular (3G, 4G, LTE, CDMA), NFC, LoRA, Wi-Fi, Wi-Max, or other applicable wireless communication protocol. In some embodiments, the wireless transceiver may "ping" a user device 110 when the user device 110 is in proximity to the wireless transceiver. The "ping" may be a request to provide identifying information about the user device 110 (MAC address, serial number, etc.). In some embodiments, the "ping" is used to request access to an application 120 associated with the entity computing system 106.

In some embodiments, the user device communication circuit 136 includes additional information related to the entity computing system 106. For example, the user device communication circuit 136 may have information related to the type of entity computing system 106 (e.g. back-end server, on-line merchant, in-store merchant, etc.), location of the entity computing system 106 and/or the user device communication circuit 136, etc. Moreover, in other embodiments, the entity computing system 106 itself generates additional information. For example, the entity computing system 106 may generate specific information related to the level of identity verification required to complete the transaction.

Figure 2:
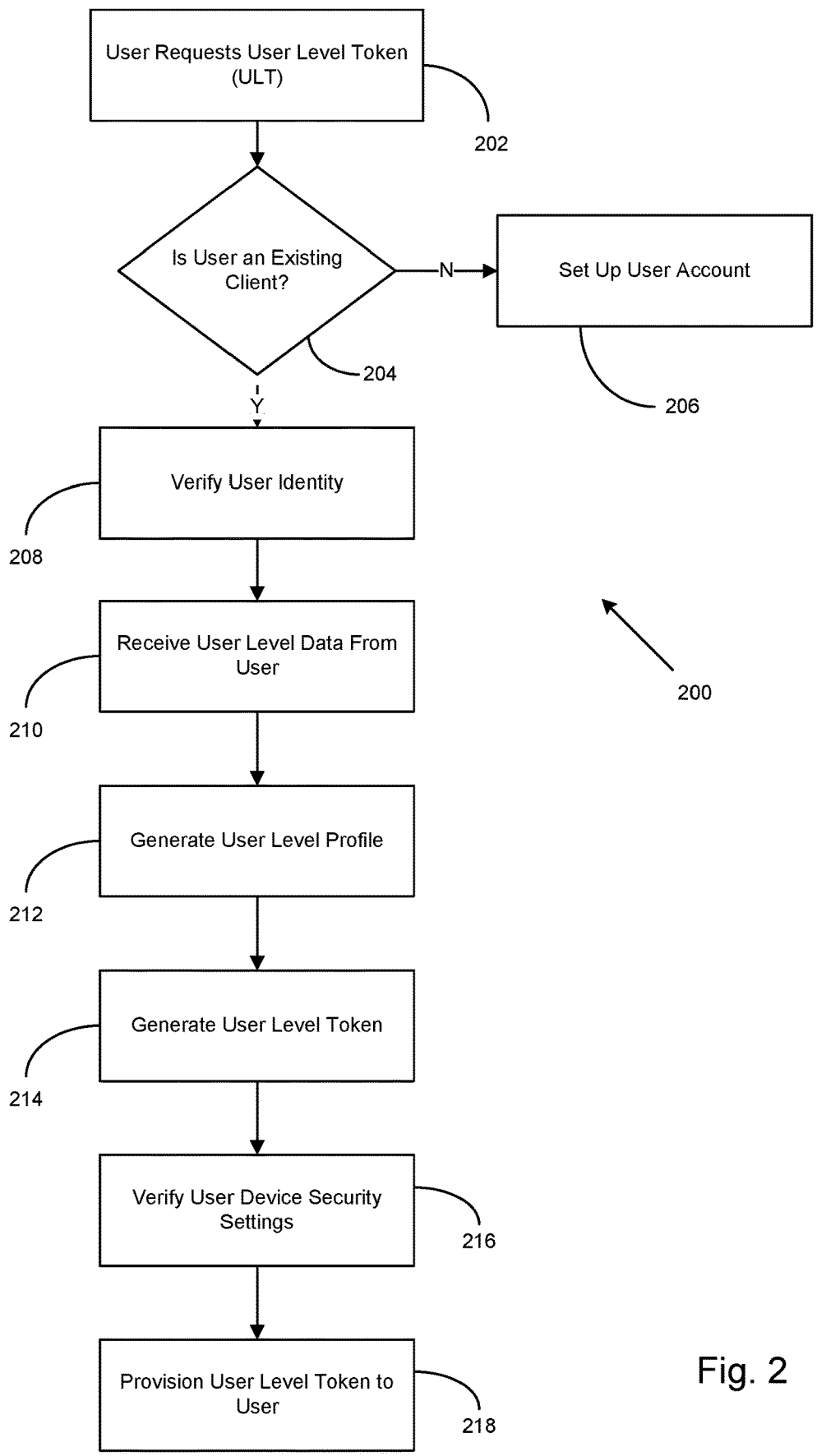
FIG. 2 is a flow diagram illustrating generation and provisioning of a user-level token, according to an embodiment.

Turning to FIG. 2, a flow diagram illustrating the generation and provisioning of a ULT to a user 102 is shown, according to an embodiment. For clarity and brevity, the method 200 is discussed below in connection with the user authentication system 100 of FIG. 1. More specifically, the method 200 may be performed by the identity verification computing system 104 of FIG. 1. However, it should be understood that the method 200 may be performed by other systems and devices.

At process block 202, a user, such as user 102, may request a ULT 118. In one embodiment, the user 102 requests the ULT 118 via a user device, such as user device 110, described above. For example, the user 102 may request a ULT 118 from the identity verification computing system 104 by accessing a smartphone application 120 associated with the identity verification computing system 104, such as mobile banking application, or mobile wallet application. In other embodiments, the user 102 accesses the identity verification computing system 104 by logging into a web-based application (e.g. website) associated with the identity verification computing system 104. However, other methods of requesting a ULT may also be used.

The process 200 then determines if the user 102 has an existing account with the institution associated with the identity verification computing system 104 at process block 204. For example, where the institution is an FI, the process 200 may determine if the user 102 has an existing account with the FI, such as a savings account, a checking account or a brokerage account. If the user 102 does not have an existing account or relationship with the entity associated with the identity verification computing system 104, the user 102 may be instructed to set up a user account at process block 206. Where the institution is an FI, the user 102 may be required to provide identifying information to allow the identity verification computing system 104 to initially verify the identity of the user 102. The identifying information may include authentication credentials and information that may be used by the identity verification computing system 104 to authenticate the user 102. Example identifying information may include legal name, address, date of birth, social security number, contact information, driver's license number, biometric data (fingerprints, retinal scans, voice prints, facial scans, etc.), or other applicable identifying information. In one embodiment, the personal identifying information provided during the new account opening process is verified prior to the user 102 being permitted to open an account with the institution. Such information may be provided in connection with KYC and/or CIP regulations.

Once the user 102 is determined to have an existing account with the institution at process block 204, or successfully sets up an account with the institution at process block 206, the identity of the user 102 requesting the ULT 118 is verified at process block 208. In one embodiment, the identity of the user 102 is verified using personal identifying information supplied by the user 102 when setting up the account with the institution. Once the identity of the user 102 has been verified, the user 102 may be instructed to provide additional non-financial data at process block 210. Non-financial data may include non-financial information such as various identity information of the user 102 (height, weight, biometrics, etc.), non-financial account information (frequent flyer miles, rewards/loyalty program information, social media accounts, on-line service accounts such as online dating accounts, etc.), multiple IDs (personal, business, etc.), or other relevant non-financial data. Additionally, the user 102 may provide data related to a user device 110 that the ULT 118 is to be provisioned. For example, the user 102 may be required to provide device information such as a MAC address, a device serial number, the phone number associated with the device, or other identifying information related to the user device 110. In some embodiments, the user 102 may use the user device 110 to request the ULT 118. Where the user 102 uses the user device 110 to request the ULT 118, the identity verification computing system 104 can request access to the user device 110. The identity verification computing system 104 may then directly communicate with the user device 110 to obtain the required information. In some examples, the user 102 may be prompted to allow access to the user device 110 by the identity verification computing system 104. In other examples, the permission to access the user device 110 may be provided when the user 102 installs an application 120, such as a mobile banking application, which is then used to request the ULT 118.

In some embodiments, the user 102 may also define permissions associated with the provided non-financial data. The permissions may be provided by the user 102 to instruct the identity verification computing system 104 as to what non-financial data may be provided to a third party. In some examples, the user 102 may specify what non-financial data should not be shared with any third party; however, in other examples, the user 102 may specify what non-financial data is accessible to different types of third parties. For example, the user 102 may specify that an FI may have access to any of the supplied non-financial data that is requested, but restrict what non-financial data a point-of-sale third party (e.g. consumer stores) may access. For example, the user 102 may not allow a point-of-sale third party to have access to user-level information such as credit scores. In further embodiments, the user 102 sets permissions as to which, if any, third party entities, may access the non-financial data, or obtain identity verification. For example, some merchants may detect the user device 110 associated with the user 102 when the user device 110 is in proximity to the user device communication circuit 136, described above. Certain merchants may have a relationship with the operator of the identity verification computing system 104. The user 102, as part of the initial provisioning of the user-level token, or subsequent to the user-level token being provisioned, may select which merchants can be allowed identity information. For example, the user 102 may select the merchants using a mobile banking application 120 on the user device 110.

Having received the non-financial data from the user 102, the process 200 can generate a user-level profile associated with the user 102 at process block 212. In one embodiment, the user-level profile is stored in the user-level profile database 124. In further embodiments, the non-financial data processing circuit 130 may generate the user-level profile based on the non-financial data provided by the user 102. In some examples, the user 102 may already have an existing user-level profile. Where the user 102 has an existing user-level profile, the user 102 may be able to provide additional non-financial data to the identity verification computing system 104, which may process the data using the non-financial data processing circuit 130, and subsequently update the user-level profile associated with the user 102. The user-level profile may include all the non-financial data provided by the user 102 at process block 210, as well as identifying information previously associated with the user 102 that was provided to set up the initial account. The user-level profile may further include information related to permissions provided by the user 102. In some embodiments, the user-level profile can be dynamically updated by the identity verification computing system 104 as more information is available.

At process block 214, the non-financial data processing circuit 130 generates a unique ULT 118 associated with the generated user-level profile for the user 102. The ULT 118 may be formatted the same as a tokenized primary account number ("TPAN"), or payment token. In one embodiment, the ULT 118 is associated directly with the institution generating the ULT 118. In some examples, the ULT 118 may include a prefix, such as a bank identification number ("BIN"), which defines where the ULT 118 should be routed when presented by the user 102. In a further embodiment, the ULT 118 is stored in a token vault, which maps the ULT 118 to a given user-level profile. For example, the token vault may be stored in the user-level profile database 124. In other embodiments, the ULT 118 may be managed by an external token service provider ("TSP"). In some embodiments, the non-financial data processing circuit 130 may further generate sub-ULTs for different identities associated with the user 102. The sub-ULTs can be structured to return different types of information, based on context. The user 102 may configure the different sub-ULTs to correspond with different transactions. For example, the user 102 may configure one sub-ULTs to be used with social media services, such as blogs, dating websites, etc. The sub-ULTs associated with the social media services may be configured to only provide verification of the identity of the user 102, and, where required, other basic information, such as the age of the user 102. In further examples, the user 102 may configure a separate sub-ULT to be used with purchases. The sub-ULT associated with making purchases may be configured to provide verification of the identity of the user 102, as well as other information, such as age verification, loyalty program information, and/or credit information. The user 102 may create as many sub-ULTs as needed for different services/entities.

After the ULT 118 has been generated at process block 214, the parameters of the user device 110 are verified to ensure that proper security is active on the user device 110. In one embodiment, the identity verification computing system 104 verifies that the user device 110 is only accessible by authorized users 102. For example, the identity verification computing system 104 may verify that the user device 110 is locked, such that an unlock code must be provided to access the user device 110. Example unlock codes may include PIN numbers, passwords, fingerprint scans, retinal scans, facial recognition scans, security tokens, or other applicable unlock codes. If the identity verification computing system 104 determines that insufficient security exists on the user device 110, a message may be sent to the user 102 requiring the user 102 to activate additional security features on the user device 110 before the ULT 118 can be provisioned. In other embodiments, the user 102 is informed that the ULT 118 may be provisioned, but that additional data may be required by the user 102 to verify that the user 102 is in possession of the user device 110 when the ULT 118 is used.

At process block 218, the ULT 118 is provisioned to the user 102. In one embodiment, the ULT 118 may be transmitted to the user device 110 by the identity verification computing system 104, via the network 108. In some examples, the identity verification computing system 104 may push the ULT 118 directly to the user device 110. In other examples, the user 102 may need to perform a specific action to have the ULT 118 provisioned to the user device 110. For example, the user 102 may be required to log in to their account with the institution that generated the ULT 118 in order to download the ULT 118 onto the user device 110. In some embodiments, the ULT 118 is stored in the user authentication circuit 114 of the user device 110. For example, the ULT 118 may be stored in a mobile wallet or other application 120 running on the user device 110. In some examples, the ULT 118 may be stored in an application 120 controlled by the app manager circuit 116.

Turning to FIG. 3, a flow diagram illustrating the processing of an identity verification request is shown, according to an embodiment. For clarity and brevity, the method 300 is discussed below in connection with the user authentication system 100 of FIG. 1. More specifically, the method 300 may be performed by the identity verification computing system 104 of FIG. 1. However, it should be understood that the method 300 may be performed by other systems and devices.

At process block 302, an identity verification request is received by the identity verification computing system 104. In one embodiment, the request originates from the entity computing system 106, and is presented to the identity verification computing system 104 by the entity computing system 106. At process block 304, the identity verification computing system 104 determines if a ULT 118 was provided with the request from the entity computing system 106. If the identity verification computing system 104 determines that a ULT 118 was not provided, the identity verification computing system 104 can access the data associated with the user 102 based on the information received in the identity request at process block 306. For example, the identity request may include information about the user 102, such as a name, a phone number, user device information, etc. The identity verification computing system 104 uses the information contained in the request to determine if a ULT 118 has been provisioned to the user 102. The identity verification computing system 104 further determines if there is a ULT 118 provisioned to the user device 110 from which the request originated.

In some embodiments, the identity verification request can be transmitted using an existing payment channel. For example, the entity computing system 106 may transmit the identity verification request to the identity verification computing system 104 in a standard card-based transaction message. For example, the identity verification request may be part of the general message derived from a card-based transaction (e.g. credit card transaction, debit card transaction, etc.). A typical card-based transaction message may include information derived from the card associated with the transaction (e.g. an account number associated with the card), the point-of-transaction terminal (e.g. entity computing system 106) identifier, such as a merchant ID, transaction information, as well as other data which can be generated or added by intervening systems. For example, the entity computing system 106 may include additional information into the card-based transaction message.

The identity verification computing system 104 requests the ULT 118 from the user device 110 at process block 308. In one embodiment, the identity verification computing system 104 initiates a "pull" activity to retrieve the ULT 118 from the user device 110. The pull activity may send a command to the user device 110 to provide the ULT 118. For example, the pull activity may send a command to the user authentication circuit 114 to transmit the ULT 118. In some examples, the pull activity may ping the user device 110 to open an app 120 associated with the identity verification computing system 104. The app 120 may then be instructed to transmit the ULT 118 to the identity verification computing system 104. In one embodiment, the instruction may include a request to open an application 120 associated with the ULT 118 on the user device 110, as well as an address for transmitting the user-level token. For example, the identity verification computing system 104 may request the user device 110 to open a mobile banking application associated with the identity verification computing system 104, and provide instructions for transmitting a ULT 118 stored in the mobile banking application to the identity verification computing system 104.

In some embodiments, the request to open an app 120 may be processed by the app manager circuit 116. The app manager circuit 116 may evaluate the source of the request (e.g. the identity verification computing device 104) to determine if the source has permission to access the desired app 120. In some embodiments, the ULT 118 is transmitted without requiring an input to the user device 110 by the user 102. In some examples, the user 102 may be presented with a prompt to allow the identity verification computing system 104 access to one or more apps 120 on the user device 110. The prompt may be presented to the user 102 the first time the identity verification computing system 104 attempts to access an app 120. The prompt may allow the user 102 to allow access for a single request, allow permanent access, or deny access to the identity verification computing system 104. Further, the user 102 may be presented with a prompt to allow for the ULT 118 to be pulled from the user device 110 by the identity verification computing system 104. Similar to the prompt discussed above, the user 102 may be able to allow the identity verification computing system 104 a one-time access to the ULT 118, a permanent access to the ULT 118, or deny access to the ULT 118. In other examples, the user 102 may be able to further define what access the identity verification computing system 104 has to pull the ULT 118, such as time based access, requestor (e.g. entity computing system 106) based access, etc.

The identity verification computing system 104 may then receive the ULT 118 from the user device 110 at process block 310. At process block 312, the identity verification computing system 104 determines if the ULT 118 is valid. In one embodiment, the identity verification circuit 128 of the identity verification computing system 104 analyzes the ULT 118 to determine if it is valid. For example, the identity verification circuit 128 may evaluate the ULT 118 to determine if it has expired. To determine if the ULT 118 has expired, the identity verification circuit 128 may access the token vault used to store the ULT 118. In other embodiments, the identity verification circuit 128 may communicate with a token service provider responsible for managing the ULT 118 to determine if the ULT 118 is still valid. In still further embodiments, the identity verification circuit 128 verifies that the received ULT 118 is the ULT 118 that was provisioned to the user device 110. While the above example describes the identity verification circuit 128 determining the validity of the ULT 118, it is contemplated that other components within the identity verification computing system 104 may be used to verify the validity of the ULT 118.

If the ULT 118 is determined to be invalid at process block 312, the identity verification computing system 104 may transmit a message to the user 102 and/or the entity computing system 106 that the ULT 118 is invalid at process block 314. If the ULT 118 is determined to be a valid ULT 118 at process block 312, the identity verification circuit 128 determines if there is sufficient data available to verify the user device 110 at process block 316. For example, the identity verification circuit 128 may evaluate if there is enough information to confirm that the user device 110 is the trusted device associated with the user 102. For example, where only a phone number is provided to indicate the identity of the user device 110, the identity verification circuit 128 may determine that more information is required to confirm that the user device 110 generating the request is the actual user device 110 associated with the user 102 (e.g. the user device 110 receiving the provisioned ULT 118). If the identity verification circuit 128 determines that there is not sufficient data available to verify the user device 110 at process block 316, the identity verification computing system 104 can send a request to the user device 110 to provide more information at process block 318.

In some embodiments, the identity verification computing system 104 may request and obtain additional device information directly from the user device 110 itself. For example, the identity verification computing system 104 may instruct an app 120 associated with the identity verification computing system 104 to provide additional information associated with the user device 110. Example additional information may include the MAC address of the user device 110, a device serial number, an FCC ID number, an IP address, etc. In further embodiments, the identity verification computing system 104 collects data regarding the configuration of the user device 110 every time it is used to access the institution associated with the identity verification computing system 104. The configurations may be stored in the user-level profile database 124 and/or the identity database 122. The configurations may include installed apps 120, such as apps associated with the identity verification computing system 104, user settings, and/or other tokens. The other tokens may be provisioned by the identity verification computing system 104 or by other entities. For example, where the identity verification computing system 104 is associated with an FI, multiple tokens may be provisioned to the user device 110 in addition to the ULT 118 described above. Tokens may be provided to the user device 110 for fraud alerts, mobile wallets, FI account access etc. Accordingly, the identity verification computing system 104 may request a list of all tokens on the user device 110.

The identity verification computing system 104 may then again evaluate the available information related to the user device 110 at process block 316. For example, the identity verification computing system 104 may evaluate the list of tokens provisioned to the user device 110 by comparing the current provisioned tokens against a record of all the known tokens provisioned to the user device 110 in the past by the identity verification computing system 104 or other entities. The identity verification computing system 104 may also evaluate the configuration data received from the user device 110 against previously known configurations of the user device 110 stored in the identity database 122 and/or the user-level profile database 124.

If there is sufficient data available to verify the user device 110, the identity verification computing system 104 then determines if there is sufficient data available to verify the user 102 associated with the user device 110 is initiating the request at process block 320. For example, where the user device 110 is a mobile device, such as a smartphone, the identity verification computing system 104 may determine whether the user device 110 includes a lock mechanism to prevent unauthorized access by a person other than the user 102 being in possession of the user device 110. This can include entering a password or a PIN number, and/or providing a biometric, such as a fingerprint, retinal scan, voice recognition, or facial recognition.

If the identity verification computing system 104 determines that there is not sufficient data available to verify the user 102 at process block 320, the identity verification computing system 104 can send a request for additional user information to the user device 110 at process block 322. In some embodiments, the identity verification computing system 104 may passively request additional information. For example, where the user device 110 is smartphone, the identity verification computing system 104 may listen to background noise and/or a voice of the user 102 to verify the user 102 identity. Previous voice samples and/or background noise samples may be collected by the identity verification computing system 104 over time and stored in the identity database 122 and/or the user-level profile database 124. In some embodiments, the user 102 agrees to let the identity verification computing system 104 have access to the microphone during identity verification requests as part of the provisioning process. In some embodiments, the user 102 may call the entity computing system 106, triggering the request for identity verification. The identity verification computing system 104 may then request access to the audio of the call from the entity computing system 106 to obtain voice and/or background noise samples to verify the identity of the user 102.

In other embodiments, the identity verification computing system 104 may push a request for additional user data to the user device 110. For example, the identity verification computing system 104 may push a message to the user device 110 instructing the user 102 to provide additional verification data. The additional verification data may include a biometric data request, such as fingerprint scan, a voice sample, a retinal scan, a facial scan, or other biometric data. Other verification data may include passwords, PIN numbers, security question answers, or the like. In some embodiments, the identity verification computing system 104 may push the request to the user 102 via an app 120 associated with the identity verification computing system 104. The app 120 may allow for the user device 110 to provide the additional data directly. For example, the app 120 may access a camera of the user device 110 and instruct the user 102 to place their face and/or retina in the frame. The app 120 can then capture a video or still image, and transmit it directly to the identity verification computing system 104 for analysis. The app 120 may further activate a fingerprint scanner of the user device 110, and instruct the user 102 to provide a fingerprint scan, which is then transmitted directly to the identity verification computing system 104. Once the identity verification computing system 104 obtains the additional user information, the identity verification computing system 104 can again determine if there is sufficient data available to verify the user 102 at process block 320.

After the identity verification computing system 104 determines that there is sufficient data available to identify the user 102 at process block 320, the identity verification computing system 104 can provide identity verification to the entity computing system 106 at process block 324.

Figure 4A:
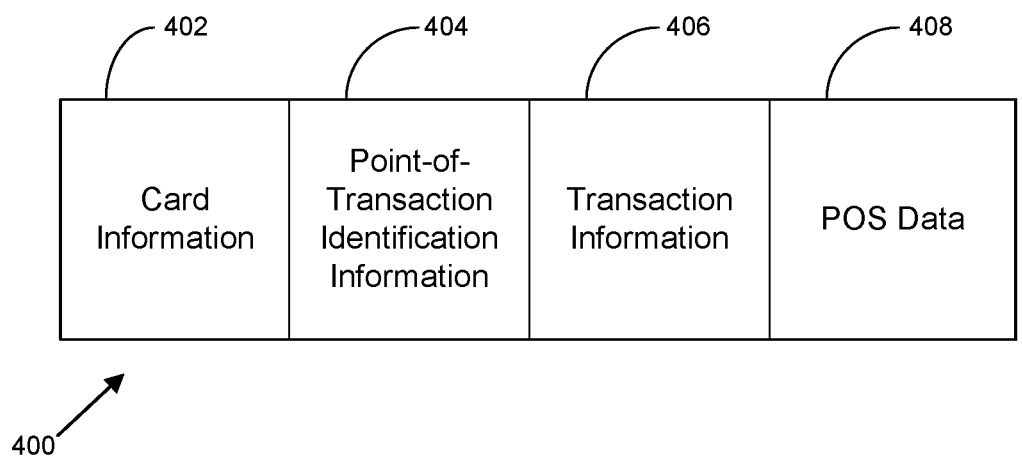
FIG. 4A is a block diagram illustrating a card-based transaction message, according to an embodiment.

Turning now to FIG. 4A, an exemplary card-based transaction message 400 is shown, accordingly to some embodiments. The card-based transaction message 400 can include a card information portion 402, a point-of-transaction identification information portion 404, a transaction information portion 406 and a POS data portion 408. The card information portion 402 can include information about the card (e.g. the payment mechanism), such as an account number. In some embodiments, the card information portion 402 can be configured to include a ULT associated with the user 102, such as the ULT 118 described above. In one embodiment, the ULT 118 is formatted the same as a personal account number (PAN) or a tokenized account number (TPAN). By configuring the ULT 118 similar to a PAN and/or TPAN, the ULT 118 can be transmitted via a payment card network using the standard card-based transaction message 400. While the ULT 118 is discussed as formatted as a PAN and/or TPAN above, it is contemplated that the ULT 118 can be formatted similar to other known card-identification messages.

The point-of-transaction identification information portion 404 can include various information associated with the point-of-transaction (e.g. entity computing system 106). For example, the point-of-transaction identification information portion 404 can include a merchant ID number. The point-of-transaction identification information portion 404 may also include merchant information, such as merchant type (e.g. physical location, internet-based entity, etc.), merchant location, or other general merchant information. The transaction information portion 406 may include information about the transaction, such as the amount of the transaction, the time of the transaction, etc. The POS data portion 408 may include various information related to the transaction. For example, the POS data portion 408 may include contextual data related to the transaction, such as the type of purchase being made, the type of merchant (e.g. airline, sporting venue, grocery store, electronics store, on-line retailer, restaurant, etc.), location of the transaction, and/or type of transaction (e.g. physical card, on-line purchase, mobile wallet, etc.). In some embodiments, the POS data portion 408 may include a ULT 118 associated with the customer. For example, a ULT 118 associated with the customer may be inserted into the POS data portion 408 of the message instead of, or in combination with, the card information portion 402, as described above. By inserting the ULT 118 into a standard card-transaction message, the ULT 118 can be provided to a system, such as identity verification computing system 104, using a typical card-based payment communication scheme.

Figure 4B:
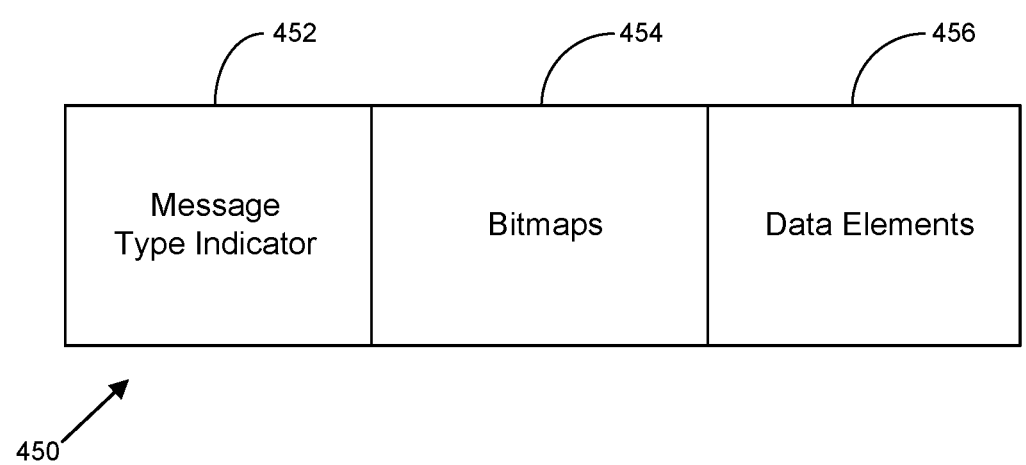
FIG. 4B is a block diagram illustrating an ISO 8583-compliant card-based transaction message, according to an embodiment.

In some embodiments, the card-based transaction message 400 may be formatted as an ISO 8583-compliant message. ISO 8583 defines message formats and communication flows to allow for different types of systems to perform card-based transactions. Turning now to FIG. 4B, an exemplary ISO 8583-compliant card-based transaction message 450 is shown, according to some embodiments. The ISO 8583-compliant message 450 may include a message type indicator 452, one or more bitmaps 454, and a number of data elements 456. In one embodiment, the message type indicator 452 is a four digit numerical field, which may be used to classify the high level function of the message. For example, the message type indicator 452 can be used to indicate the ISO 8583 version of the ISO message 450. The message type indicator 452 can further be used to indicate a class of the message. For example, whether the message is an authorization message, a financial message, a reconciliation message, an administrative message, or any other message class utilizing ISO 8583 messages. The message type indicator 452 can further be used to indicate a function of the message to define how the message should flow within a system. Message functions can include requests (end-to-end messages), or advices (point-to-point messages). Additionally, message functions may include notifications, and/or instructions. Finally, the message type indicator 452 can be used to indicate a message origin. The message origin may be with an acquirer, an issuer, or other entity.

The bitmaps 454 may be configured as a field or sub-field within the message which can indicate which data elements 456 or data element subfields may be present in a message. In some embodiments, the bitmaps 454 may include a primary bitmap, which can indicate which of data elements 456 one to sixty-four are present. Additional bitmaps 454 (secondary, tertiary, etc.) can further be used to indicate which data elements 456 beyond sixty-four are present in the message. In one embodiment, a specific data element 456 is only present when a specific bit in the bitmap is "true." The bitmap may be expressed as a binary value, such as an eight byte message, a hexadecimal value, an ASCII character set, or an EBCDIC character set. The data elements 456 may include a number of individual fields containing information about the transaction. For example, in some ISO 8583-compliant messages, there may be up to one-hundred ninety-two data elements 456; however more or fewer data elements 456 are also contemplated. The data elements 456 may include specific data elements, general purpose data elements, system-specific data elements, and/or country-specific data elements. Further, each individual data element 456 may be described using a standard format which can define the permitted content of the field (e.g. numeric value, binary value, hexadecimal value, alpha-numeric value, etc.) and a field length (e.g. variable length or fixed length).

The data elements 456 may include contextual data which may be processed by an FI or other system, such as identity verification computing system 104. For example, data elements 456 may provide a time of transaction, a date of a transaction; a merchant type, a payee; an account identifier, a custom field, or any other data element field available in the data element 456. Further, in some embodiments, a ULT, such as ULT 118, may be transmitted as a data element within the data elements 456. In one embodiment, the ULT 118 may be provided as a primary account number (PAN) (data Field 2) data element, an extended PAN (data element 34), or as a custom or private data elements (e.g. via data element 48, 61, etc.). Similar to above, by using an ISO 8583-compliant message to transmit the ULT 118, a common messaging format over an existing card-based transaction network can be utilized to provide a ULT 118, along with contextual data, to an identity verification computing system, such as identity verification computing system 104. While the above examples illustrate transmitting a ULT 118 and contextual data over known card-based transaction messages, it is contemplated that other card-based transaction messages may be used to transmit the ULT 118 and/or contextual data from the entity computing system 106 to the identity verification computing system 104.

Figure 5:
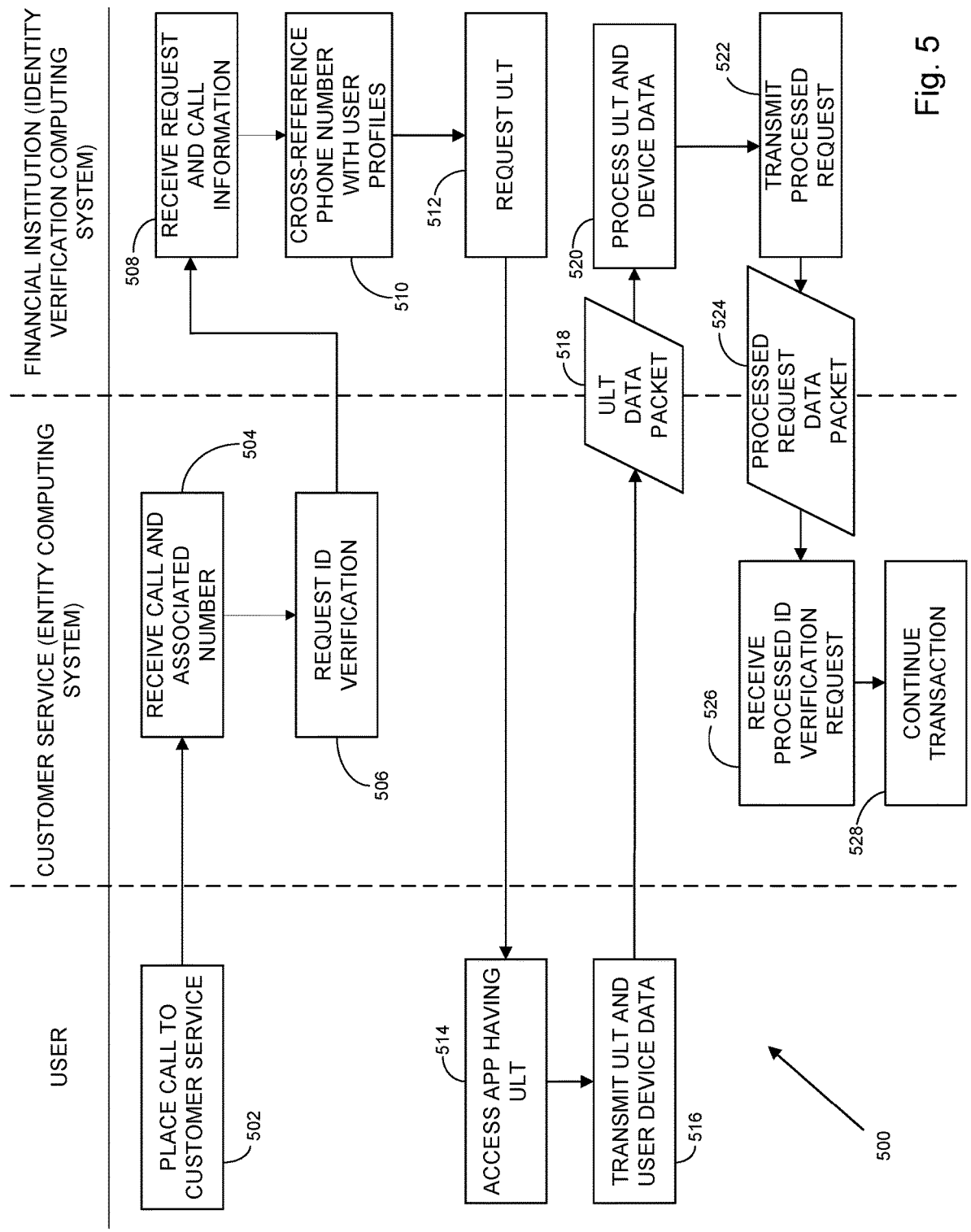
FIG. 5 is a flow diagram illustrating an example implementation of the method shown in FIG. 3.

Turning now to FIG. 5 an example implementation 500 of the above process 300 is shown. The example implementation 500 of FIG. 5 is described in the context of a user 102 placing a call to a customer service call center. At process block 502, the user 102 places a call to customer service via a user device 110 associated with the user 102. The call is received, along with the associated phone number of the user device 110, by the customer service call center (e.g. entity computing system 106), at process block 504. At process block 506, the customer service call center requests identity verification of the user 102 associated with the received phone number. In one embodiment, the customer service call center requests the identity verification of the user 102 from an FI (e.g. identity verification computing system 104) associated with the customer service call center.

At process block 508, the FI receives the identity verification request along with the associated phone number from which the call was initiated from the customer service call center. At process block 510, the FI cross-references the phone number with the phone numbers of users 102 associated with the FI. In one embodiment, the phone numbers of users 102 associated with the FI are stored in the identity database 122 and/or the user-level profile database 124. The FI can then determine what, if any, ULT 118 is associated with the user device 110 that placed the call. At process block 512, the FI initiates a request for the ULT 118, and transmits the request to the user device 110. The request is received by the user device 110 and accesses an application 120 containing the ULT 118 at process block 514. As described above, the FI, via the identity verification computing system 104, may access the application 120 directly. In other examples, the FI may access the application 120 through the app manager circuit 116. In some embodiments, the identity verification system 104 transmits the request to the user device 110 via (e.g., routing through) the entity computing system 106.

In one embodiment, the application 120 is a mobile banking application associated with the FI. However, the application 120 may be other types of applications associated with mobile banking, such as a fraud alert application, a mobile wallet application, and the like. At process block 516, the application authenticates the requestor of the ULT 118, and then transmits the ULT 118, along with additional data related to the user device 110, as a ULT data packet 518. The additional data related to the user device 110 may include user device 110 identifying information (MAC address, FCC ID number, device serial number), additional tokens associated with the FI (fraud alert tokens, mobile wallet tokens, etc.), the security profile of the user device 110 (e.g. whether the device is locked, or if the access levels have been changed), and/or other information relevant to identifying the user device 110. In some embodiments, the application 120 is configured to provide the additional user device 110 data whenever the ULT 118 is requested by the FI. In other embodiments, the request sent by the FI may specifically request certain identifying data be supplied, if available. As described above, the user 102 may be able to set permissions to limit the amount of additional device data that is provided to the FI. In some embodiments, the application 120 is accessed and transmits the requested data in the background without the user 102 being notified. In other embodiments, a prompt is provided to the user 102, via the user device 110, to obtain permission to access the application 120 and transmit data to the FI for identity verification purposes.

At process block 520, the FI receives the ULT data packet 518 and processes the ULT 118 and additional device data. As described above, the FI may first validate the ULT 118. The FI may then analyze the additional device data to verify that the user device 110 calling the customer service call center is the user device 110 associated with the user 102. The fact that the identity verification service is able to pull the ULT from the user device provides confirmation that a fraudster has not obtained the user's device and performed a "factory reset" of the device, which would erase the token from the device. At process block 522, the FI transmits the processed request to the customer service call center as a processed request data packet 524. The processed request data packet 524 may contain an identity verification of the user 102, as well as other information. Other information may include non-financial data, account information, or other data required or requested by the customer service call center. The customer service center then processes the received processed request to verify the identity of the user 102, at process block 526, and then continues the transaction with the user 102 at process block 528.

Figure 6:
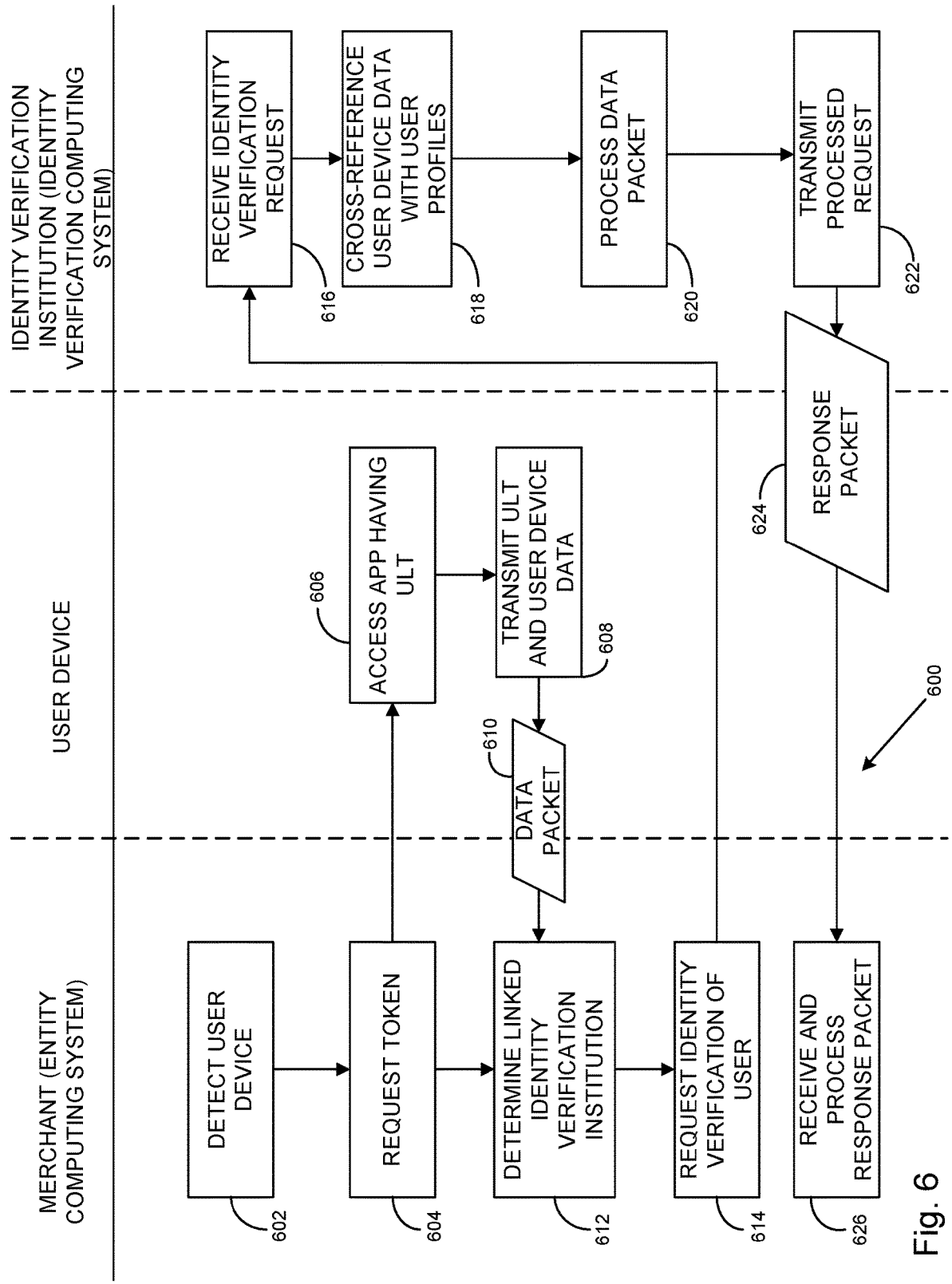
FIG. 6 is a flow diagram illustrating an example implementation of the method shown in FIG. 3.

Turning now to FIG. 6, a further example 600 of the process 300 described above, is shown according to some embodiments. The example implementation 600 of FIG. 6 is described in the context of a user device 110 being detected by a merchant system. The merchant system may be able to detect a token and/or an application 120 associated with the merchant on a user device 110, but generally will not be able to verify the user 102 themselves. The following example describes a process for the merchant to work with the identity verification computing system 104 to verify the identity of the user 102. At process block 602, the merchant (e.g. entity computing system 106) detects the user device 110. In one embodiment, the merchant detects the user device 110 via the user device communication circuit 136. For example, the user device communication circuit 136 may be a wireless beacon that transmits a low energy Bluetooth signal to trigger activity by the user device 110. In other embodiments, the user 102 presents the user device 110 to the user device communication circuit 136. For example, the user device communication circuit 136 may be a kiosk located at the merchant. In some examples, the user 102 may activate an application 120 associated with the merchant, which may then generate a machine readable image, such as a QR code or a 2D bar code. The machine readable image may be read by the kiosk (e.g. the user device communication circuit 136) to detect the user device 110. In other examples, the user 102 may activate an application 120 associated with the merchant which can wirelessly communicate with the kiosk (e.g. the user device communication circuit 136). For example, the user 102 may activate the application 120 associated with the merchant and place the user device 110 in close proximity to the kiosk to communicate with the kiosk via NFC communication. In other examples, other wireless communication methods such as Bluetooth, Wi-Fi, Wi-Max, LoRA, IR, cellular, or other wireless communication protocols.

After detecting the user device 110, the entity computing system 106 requests the ULT from the user device 110 at process block 604. For example, the ULT may be stored on the user device 110 in a manner that is accessible by third party applications. In some embodiments, the identity verification service may provide an SDK that facilitates interoperability with third party applications provided by trusted entities. The ULT is then retrieved from the user device at process block 606 and transmitted to the entity computing system 106 at block 608 in the form of ULT data packet 610. Additional data related to the user device 110 may also be transmitted, such as user device identifying information (MAC address, FCC ID number, device serial number), additional tokens associated with the FI (fraud alert tokens, mobile wallet tokens, etc.), the security profile of the user device 110 (e.g. whether the device is locked, or if the access levels have been changed), a current geo-location of the user device 110, and/or other information relevant to identifying the user device 110. In some embodiments, the additional user device data is provided whenever the ULT 118 is requested. In other embodiments, the request for the ULT may specifically request certain identifying data be supplied, if available. As described above, the user 102 may be able to set permissions to limit the amount of additional device data that is provided to the FI. In some embodiments, the requested data is transmitted in the background without the user 102 being notified. In other embodiments, a prompt is provided to the user 102, via the user device 110, to obtain permission to access and transmit the additional data for identity verification purposes.

In some embodiments, a third party token is also retrieved from the user device 110. The third party token may have been provisioned to the user by the merchant. For example, the merchant may be able to perform an initial identification of the customer using the third party token, but may subsequently use the ULT to obtain additional information about the customer or to otherwise obtain additional authentication of the user. For example, in some embodiments, the merchant is a supermarket at which the user 102 has previously established a customer account and was provisioned a third party token associated with the merchant. The third-party token is used in connection with a smart grocery shopping app to guide the user 102 around the supermarket based on the grocery list of the user 102. In other examples, the merchant may be a retail store at which the user 102 has previously established a customer account and was provisioned a third party token associated with the merchant. The third party token is used in connection with a directed sales application. The directed sales application may maintain a history of previous items that the user 102 has purchases. The salesperson may receive an indication that the user 102 has entered the store and provide the user with items they may be interested in based on the previous purchases. In one embodiment, the third party token is associated with the merchant and/or the application 120 associated with the merchant stored on the user device 110. In some embodiments, the merchant, after detecting the user device 110, transmits a command to the user device 110 to request the third party token. The request may be processed by the application 120 associated with the merchant stored in the user device 110. In other embodiments, the merchant may request the third party token via the user device 110 by presenting the user 102 with a prompt to provide the third party token. The user 102 may then affirmatively decide to present the third party token to the merchant. In some examples, the merchant only requests the third party token from the user device 110 where the merchant determines that the user device 110 is associated with a previously provisioned third party token. For example, the user 102 may have to register the device with the merchant when installing the application 120 associated with the merchant.

Once the merchant receives the ULT, the entity computing system 106 then determines, at process block 612, a linked identity verification service that is associated with the ULT (i.e., in embodiments where more than one identity verification service exists). In some embodiments, the merchant may have a trusted relationship with the identity verification service that allows the merchant to request identity verification of users 102 who are detected at a merchant location via their user device 110. In some embodiments, the user 102 must be associated with the FI. For example, the user 102 may be required to have an account with the FI, where the FI is a bank. In further embodiments, the user 102 selects which merchants or other third-party entities have permission to contact the FI to request an identity verification. For example, the user 102 may be presented with a list of third party entities having a relationship with the FI during an initial account set up. The user 102 may then select some, all, or none of the third party entities to be allowed to request identity verification from the FI. In other embodiments, the user 102 may be asked whether to allow a third party entity access to request an identity verification when the user 102 downloads and/or executes an application 120 associated with the third party entity. If the user 102 allows a third party entity permission to request an identity verification of the user 102, the FI may communicate the permission to the third party entity, along with information that the user 102 is associated with the FI.

The merchant may request an identity verification of the user 102 at process block 614. The FI may receive the identity verification request at process block 616. The identity verification request may include information such as user device information (MAC address, FCC ID number, user device serial number, etc.), and/or user 102 information (name of user associated with the third party token, etc.). After receiving the identity verification request, the FI cross-references the received user 102 and/or device information with user profiles to determine a user 102 associated with the received information at process block 618.

At process block 620, the FI processes the ULT 118 and additional device data. As described above, the FI may first validate the ULT 118. The FI may then analyze the additional device data to verify that the user device 110 detected at the merchant is the user device 110 associated with the user 102. In some examples, the FI may analyze the geolocation of the user device 110 associated with the ULT 118 to verify that it is near the location of the merchant. The FI may further evaluate the security present on the user device 110 to determine a confidence level that the user 102 associated with the user device 110 is the one in possession of the user device 110. In some examples, only a low confidence level may be required where only basic identity verification is required. A higher confidence level may be required where more sensitive information, such as financial information is required. As described above in regards to FIG. 3, the FI may require additional information from the user 102, such as biometric identification, where the confidence level required in the user identity is not achieved based on the information provided in the ULT data packet 610.

At process block 624, the FI transmits the processed request to the merchant as a response packet 626. The response packet 626 may contain an identity verification of the user 102, as well as other information. Other information may include non-financial data, account information, or other data required or requested by the merchant. In some embodiments, the level or type of information provided by the FI to the merchant may be pre-defined by the user 102. In some embodiments, financial data may be transmitted as well within the response packet 626. For example, the response packet 626 may include a tokenized primary account number (TPAN) of one of the payment cards of the user 102 to allow for a purchase to be completed. In some examples, this may be a transaction limited TPAN, such that it is only good for a specific requested transaction. Additionally, in one embodiment, the response packet 626 may include a restricted-use payment token. The restricted-use payment token may allow the user 102 to perform certain financial transactions with the entity computing system 106. The restricted-use payment token may be restricted to use at a certain POS device, during a defined duration, for defined transactions, while the user 102 is located within a defined area, or any combination of the following restrictions. The merchant then processes the response packet 626 to verify the identity of the user 102, at process block 628.

As previously noted, in some embodiments, the user may be provided with a dashboard that enables the user to specify controls over information that may be shared with merchants. For example, the user may specify that some merchants be permitted access to certain information, while other merchants are not to be permitted access to the same information. In some embodiments, the user 102 may configure their account to require the identity verification computing system 104 to request permission from the user 102 before any information about the user is provided to any merchant. In other embodiments, the user 102 may configure their account to specify what information may be shared without permission of the user and what information may be shared but only with the permission of the user. In some embodiments, the user may specify on a merchant-by-merchant basis what information may be shared without approval, which information may be shared but only with approval, and which information may never be shared. In some embodiments, when a user is prompted to provide approval to share information, and the user gives approval, the user is further prompted whether the user wishes to save that setting for that merchant.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method performed by an identity verification computing system, the method comprising:
  generating a unique user-level token (ULT) associated with a user-level profile, the user-level profile associated with a user device, the user device associated with a user;
  provisioning the user-level token to the user device;
  receiving a request to provide an identity verification of the user via an entity computing system, the request including data associated with the user device;
  accessing the user-level profile associated with the user device;
  obtaining the user-level token from the user device, the user-level token being pulled from the user device, the user-level token associated with the user-level profile, wherein a request for the user-level token includes instructions to the user device to open an application associated with the user-level token and an address to transmit the user-level token to the identity verification computing system, and wherein the user-level token is received from the user device without requiring input to the user device by the user;
  validating the user-level token; and
  transmitting an identity verification approval to the entity computing system.

2. The method of claim 1, further comprising:
  determining if sufficient data is available to verify the identity of the user device;
  sending a request for additional device information to the user device in response to determining that there is not sufficient data available to verify the identity of the user device; and
  receiving additional device information from the user device.

3. The method of claim 2, wherein the additional device information includes at least one of a MAC address of the user device, a device serial number, an FCC ID number and an IP address.

4. The method of claim 2, wherein the additional device information includes a list of non-ULT tokens provisioned to the user device.

5. The method of claim 4, wherein the non-ULT tokens are tokens associated with the identity verification computing system.

6. The method of claim 2, further comprising storing the additional device information in the user-level profile associated with the user device.

7. The method of claim 1, further comprising:
   determining if sufficient data is available to verify the identity of the user;
   sending a request for additional user information to the user device in response to determining that there is not sufficient data available to verify the identity of the user; and
   receiving additional user information from the user device.

8. The method of claim 7, wherein the additional user information comprises biometric data provided by the user.

9. The method of claim 7, further comprising evaluating a security setting of the device to determine if sufficient data is available to verify the identity of the user.

10. The method of claim 1, wherein the request to provide the identity verification of the user is received in response to the user contacting the entity computing system via the user device.

11. A system, comprising:
    an entity computing device configured to interface with a user device associated with a user; and
    an identity verification computing system, comprising a processor and instructions stored in non-transitory machine-readable media, the instructions configured to cause the identity verification computing system to:
       generate a unique user-level token (ULT) associated with a user-level profile, the user-level profile associated with a user device, the user device associated with a user;
       provision the user-level token to the user device;
       receive an identity verification request for the user from the entity computing device, the request comprising data associated with the user device;
       access the user-level profile associated with the user device;
       obtain the user-level token from the user device, the user level token being pulled from the user device, the user-level token associated with the user-level profile, wherein a request for the user-level token includes instructions to the user device to open an application associated with the user-level token and an address to transmit the user-level token to the identity verification computing system, and wherein the user-level token is received from the user device without requiring input to the user device by the user;
       validate the user-level token; and
       transmit an identity verification approval to the entity computing system.

12. The system of claim 11, wherein the instructions are further configured to cause the identity verification computing system to:
    determine if sufficient data is available to verify the identity of the user device;
    send a request for additional device information to the user device in response to determining that there is not sufficient data available to verify the identity of the user device; and
    receive additional device information from the user device.

13. The system of claim 12, wherein the additional device information includes at least one of a MAC address of the user device, a device serial number, an FCC ID number and an IP address.

14. The system of claim 12, wherein the additional device information includes a list of non-ULT tokens provisioned to the user device.

15. The system of claim 14, wherein the non-ULT tokens are tokens associated with the identity verification computing system.

16. The system of claim 11, wherein the instructions are further configured to cause the identity verification computing system to store the additional device information in a user-level profile database associated with the user.

17. The system of claim 11, wherein the instructions are further configured to cause the identity verification computing system to:
    determine if sufficient data is available to verify the identity of the user;
    send a request for additional user information to the user device in response to determining that there is not sufficient data available to verify the identity of the user; and
    receive additional user information from the user device.

18. The system of claim 17, wherein the instructions are further configured to cause the identity verification computing system to evaluate a security setting of the device to determine if sufficient data is available to verify the identity of the user.

19. An identity verification computing system, comprising:
    a network interface configured to communicate with an entity computing system via a network;
    an identity database configured to store a plurality of user-level profiles;
    a memory configured to store instructions; and
    at least one processor configured to execute the instructions stored on the memory to:
       generate a unique user-level token (ULT) associated with a user-level profile, the user-level profile associated with a user device, the user device associated with a user;
       provision the user-level token to the user device;
       receive an identity request for the user from the entity computing device, the request comprising data associated with the user device;
       access the user-level profile associated with the user device;
       request the user-level token from the user device, the user-level token associated with the user-level profile, wherein the request for the user-level token includes instructions to the user device to open an application associated with the user-level token and an address to transmit the user-level token to the identity verification computing system, and wherein the user-level token is received from the user device without requiring input to the user device by the user;
       receive the user-level token from the user device;
       validate the user-level token; and
       transmit an identity verification approval to the entity computing system.

20. The system of claim 19, wherein the processor is further configured to:
    determine if sufficient data is available to verify the identity of the user device;

send a request for additional device information to the user device in response to determining that there is not sufficient data available to verify the identity of the user device; and receive additional device information from the user device.

21. The system of claim 20, wherein the additional device information includes at least one of a MAC address of the user device, a device serial number, an FCC ID number and an IP address.

22. The system of claim 20, wherein the additional device information includes a list of non-ULT tokens provisioned to the user device.

23. The system of claim 22, wherein the non-ULT tokens are tokens associated with the identity verification computing system.

24. The system of claim 20, wherein the processor is further configured to cause the identity verification computing system to store the additional device information in a user-level profile database associated with the user.

25. The system of claim 20, wherein the processor is further configured to:
   determine if sufficient data is available to verify the identity of the user;
   send a request for additional user information to the user device in response to determining that there is not sufficient data available to verify the identity of the user; and
   receive additional user information from the user device.

26. The system of claim 25, wherein the processor is further configured to cause the identity verification computing system to evaluate a security setting of the device to determine if sufficient data is available to verify the identity of the user.

* * * * *